United States Patent
Sparkes et al.

(10) Patent No.: US 9,514,150 B2
(45) Date of Patent: Dec. 6, 2016

(54) AUTOMATIC WORM-RETENTION STATE TRANSITIONS

(71) Applicant: HEWLETT PACKARD ENTERPRISE DEVELOPMENT LP, Houston, TX (US)

(72) Inventors: Andrew M Sparkes, Bristol (GB); Rajkumar Kannan, Bangalore (IN); Michael J Spitzer, Portland, OR (US); Joseph E Fernandes, Bangalore (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 194 days.

(21) Appl. No.: 13/866,732

(22) Filed: Apr. 19, 2013

(65) Prior Publication Data

US 2014/0317157 A1 Oct. 23, 2014

(51) Int. Cl.
*G06F 17/30* (2006.01)
(52) U.S. Cl.
CPC .................. *G06F 17/30188* (2013.01)
(58) Field of Classification Search
CPC .................. G06F 17/30188; G06F 3/0643
USPC .................................................. 707/822
See application file for complete search history.

(56) References Cited

U.S. PATENT DOCUMENTS

| | | | |
|---|---|---|---|
| 5,491,807 A * | 2/1996 | Freeman et al. | 711/1 |
| 5,813,009 A * | 9/1998 | Johnson et al. | 707/695 |
| 5,991,753 A * | 11/1999 | Wilde | |
| 7,103,740 B1 * | 9/2006 | Colgrove et al. | 711/162 |
| 7,107,416 B2 * | 9/2006 | Stuart et al. | 711/159 |
| 7,146,388 B2 * | 12/2006 | Stakutis et al. | |
| 7,155,466 B2 * | 12/2006 | Rodriguez et al. | 707/694 |
| 7,392,234 B2 * | 6/2008 | Shaath et al. | |

(Continued)

FOREIGN PATENT DOCUMENTS

WO  WO 2004/084010 A2 *  9/2004
WO  WO-2007086844        8/2007

OTHER PUBLICATIONS

Sion, Radu, "Strong Worm", ICDCS 2008, Beijing, China, IEEE Computer Society, Jun. 17-20, 2008, pp. 69-76.*

(Continued)

*Primary Examiner* — Robert Stevens
(74) *Attorney, Agent, or Firm* — Hewlett Packard Enterprise Patent Department

(57) ABSTRACT

Example embodiments relate to automatic WORM-retention state transitions. In example embodiments, a storage computing device may detect a request to access, via a file system, a file that is associated with a first retention state. The first retention state may indicate either a first type of WORM-retention protection for the file or no WORM-retention protection for the file. The storage computing device may determine, in response to the request, that the file should be designated with a second retention state. The second retention state may indicate a second type of WORM-retention protection for the file. The determination may be based on a retention policy file that is tightly integrated with the file system and metadata of the file. The storage computing device may transition the file (e.g., by communicating with the file system) to be associated with the second retention state instead of the first retention state.

15 Claims, 4 Drawing Sheets

(56) References Cited

U.S. PATENT DOCUMENTS

| | | | | |
|---|---|---|---|---|
| 7,526,621 | B2* | 4/2009 | Stuart | G06F 17/30082 707/999.102 |
| 7,580,950 | B2* | 8/2009 | Kavuri et al. | |
| 7,590,807 | B2* | 9/2009 | McGovern et al. | 711/159 |
| 7,593,532 | B2* | 9/2009 | Plotkin et al. | 380/284 |
| 7,752,401 | B2* | 7/2010 | Merrick et al. | 711/161 |
| 7,870,104 | B2* | 1/2011 | Fujii et al. | 707/689 |
| 8,170,985 | B2 | 5/2012 | Zimran et al. | |
| 8,234,317 | B1 | 7/2012 | Pogde | |
| 8,281,087 | B2* | 10/2012 | Stuart | G06F 17/30082 707/662 |
| 8,291,179 | B2 | 10/2012 | Bondurant et al. | |
| 8,407,185 | B2* | 3/2013 | Akagawa | G06F 17/30117 707/662 |
| 8,516,022 | B1* | 8/2013 | Kanteti et al. | 707/827 |
| 8,583,881 | B1* | 11/2013 | Stuart | G06F 17/30082 707/662 |
| 8,631,215 | B1* | 1/2014 | Verma et al. | 711/156 |
| 2005/0055519 | A1* | 3/2005 | Stuart | G06F 17/30082 711/159 |
| 2005/0097260 | A1* | 5/2005 | McGovern | G06F 3/0623 711/100 |
| 2005/0210028 | A1* | 9/2005 | Kodama | G06F 3/0623 |
| 2005/0216534 | A1* | 9/2005 | Ikezawa et al. | 707/204 |
| 2006/0010301 | A1* | 1/2006 | Yagawa | 711/163 |
| 2006/0123232 | A1* | 6/2006 | Cannon et al. | 713/165 |
| 2006/0282629 | A1* | 12/2006 | Stuart | G06F 17/30082 711/159 |
| 2007/0094468 | A1* | 4/2007 | Haustein | G06F 21/6218 711/163 |
| 2008/0172563 | A1* | 7/2008 | Stokes | 713/193 |
| 2009/0049003 | A1* | 2/2009 | Hsu | G06F 17/30188 |
| 2009/0119354 | A1* | 5/2009 | Stuart | G06F 17/30082 |
| 2009/0125572 | A1* | 5/2009 | Cannon et al. | 707/205 |
| 2010/0088528 | A1* | 4/2010 | Sion | 713/193 |
| 2011/0191306 | A1* | 8/2011 | Akagawa et al. | 707/692 |
| 2011/0238714 | A1* | 9/2011 | Hsu | 707/821 |
| 2012/0221811 | A1 | 8/2012 | Sparkes et al. | |

OTHER PUBLICATIONS

Verma, Akshat, et al., "An Architecture for Lifecycle Management in Very Large File Systems", MSST 2005, Monterey, CA, Apr. 11-14, 2005, IEEE Computer Society, pp. 160-168.*

Santry, Douglas S., et al., "Deciding when to forget in the Elephant file system", SOSP-17, Kiawah Island, SC, Dec. 1999, pp. 110-123.*

Sion, Radu, et al., "Fighting Mallory the Insider: Strong Write-Once Read-Many Storage Assurances", IEEE Transactions on Information Forensics and Security, vol. 7, No. 2, Apr. 2012, pp. 755-764.*

Microsoft Computer Dictionary, 5th Edition, Microsoft Press, Redmond, WA, © 2002, p. 219.*

"Information Lifecycle Management: An Automated Approach", Technical White Paper, © 2003 EMC Corporation and Legato Systems, Inc., pp. 1-20.*

Lueth, Chris, "WORM Storage on Magnetic Disks Using SnapLock ComplianceTM and SnapLock EnterpriseTM", Technical Report TR3263, Network Appliance, Inc., © 2003, pp. 1-13.*

Hsu, Windsor W., et al., "Content Immutable Storage: Truly Trustworthy and Cost-Effective Storage and Electronic Records", IBM Research Report, RJ10332 (A0410-018), IBM Research Division, San Jose, CA, Oct. 18, 2004, pp. 6 pages.*

Quinlan, S., A Cached Worm File System, (Research Paper), Oct. 30 2006, 11 pps., http://plan9.bell-labs.com/who/seanq/cw.pdf.

"EMC VNX File-Level Retention Overview", retrieved on Sep. 30, 2015 from http://www.emc.com/collateral/hardware/white-papers/h10684-vnx-file-level-retention-wp.pdf, 21 pages.

"Using VNX File-Level Retention, P/N 300-0150101 Rev 02", EMC VNX Series, Release 8.1, retrieved on Sep. 30, 2015 from http://www.emc.com/collateral/TechnicalDocument/docu48453.pdf, 66 pages.

"Setting the autocommit period", NetApp Inc., retrieved on Sep. 30, 2015 from https://library.netapp.com/ecmdocs/ECMP1196889/html/Guid-1D7DA2A3-4349-46C1-9C13-F687310B4BFD.html, 1 pg.

"How SnapLock autocommit feature works", NetApp Inc., retrieved on Sep. 30, 2015 from https://library.netapp.com/ecmdocs/ECMP1196889/html/GUID-6FFE24E8-A8C1-4520-A9FD-B7EA07964D49.html, 1 pg.

"What a WORM file is", NetApp Inc., retrieved on Sep. 30, 2015 from https://library.netapp.com/ecmdocs/ECMP1196889/html/GUID-76C9D555-9A1B-4224-915C-F3927E5189A6.html, 1 pg.

"Data ONTAP 8.2 Archive and Compliance Management Guide for 7-MODE", NetApp Inc., retrieved on Oct. 1, 2015 from https://library.netapp.com/ecm/ecm_download_file/ECMP1196889, 141 pages.

* cited by examiner

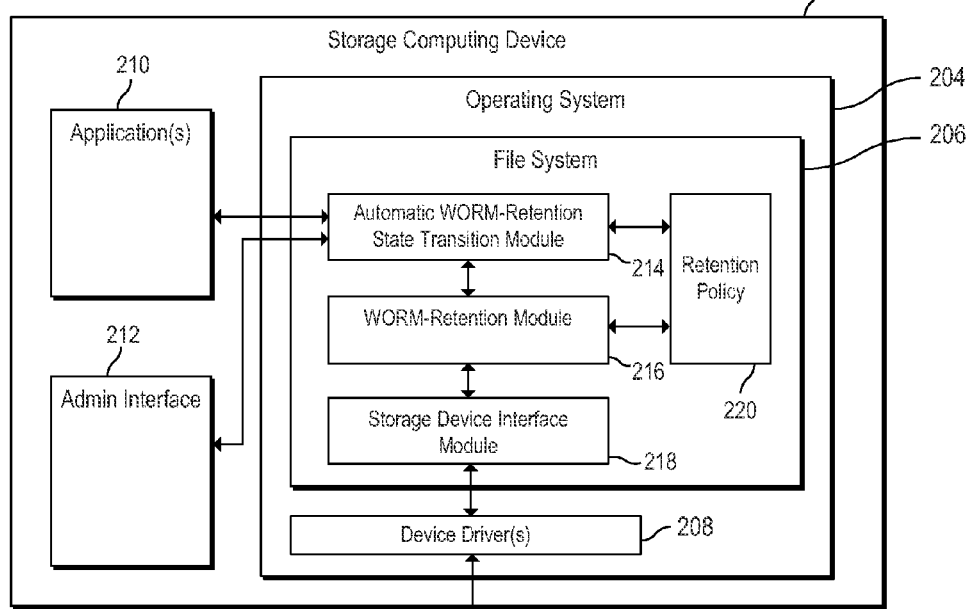
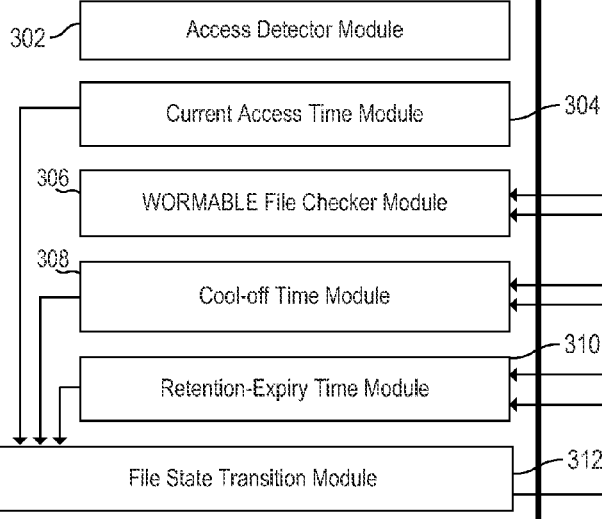

AUTOMATIC WORM-RETENTION STATE TRANSITIONS

BACKGROUND

In some scenarios, certain electronic data or files in a computing system or network may need to be retained for a period of time (a "retention period"). For example, federal and state laws, regulatory authorities and/or enterprise internal policies may require such retention of data. Data may be required to be retained, for example, to maintain a reliable record of certain events (e.g., stock exchange transactions). During such a retention period, data subject to retention may be required to be protected against change, and perhaps deletion.

BRIEF DESCRIPTION OF THE DRAWINGS

The following detailed description references the drawings, wherein:

FIG. 2 is a block diagram of an example storage system for automatic WORM-retention state transitions;

FIG. 3 is a block diagram of an example automatic WORM-retention state transition module;

DETAILED DESCRIPTION

Figure 1:
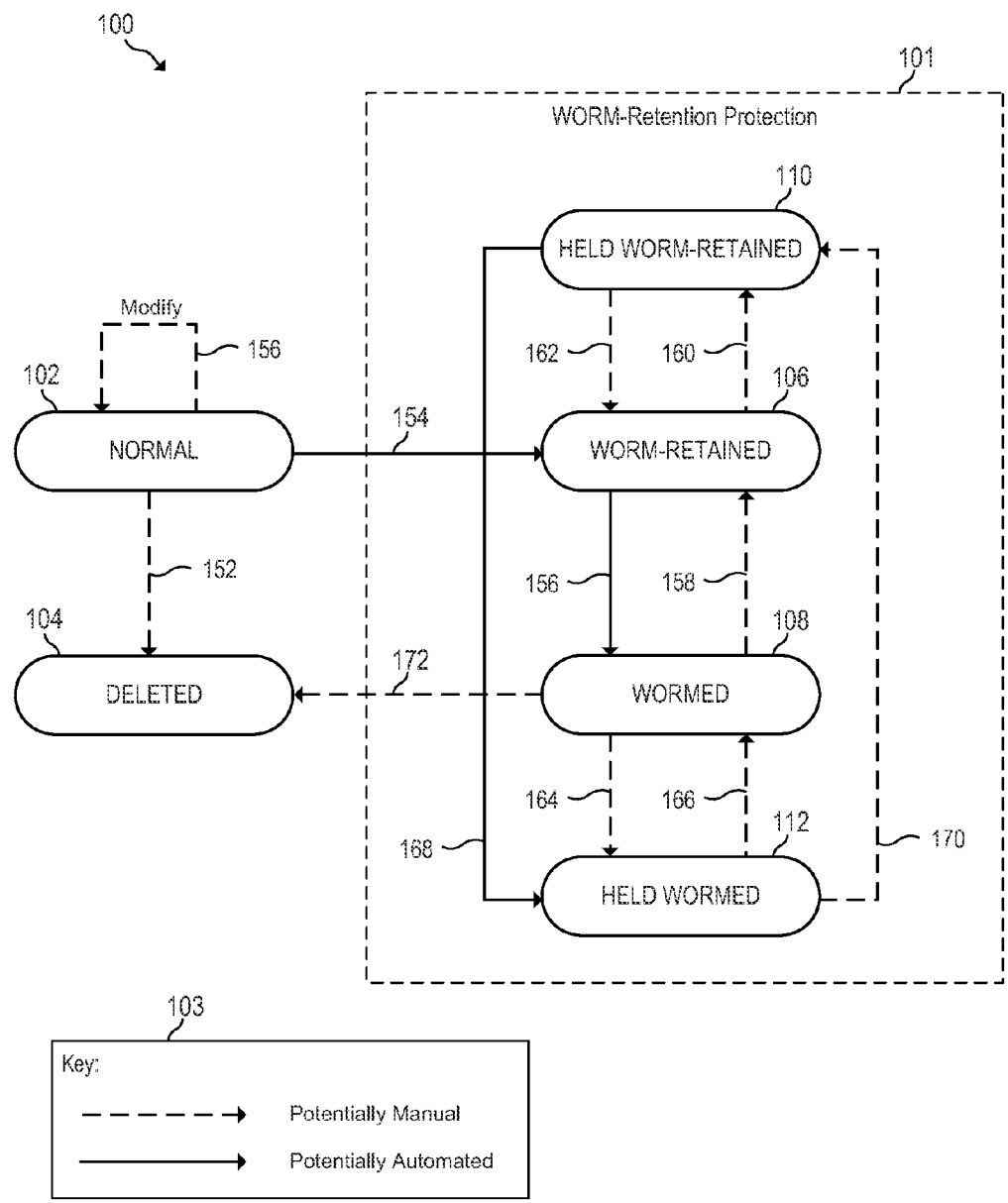
FIG. 1 is a flowchart of an example WORM lifecycle for a file, where, according to solutions of the present disclosure, automatic WORM-retention state transitions may be applicable in such a lifecycle.

A write-once-read-many (WORM) data retention scheme may be used to retain electronic data or files in immutable form (i.e. not susceptible to change). In a WORM data retention scheme, data to be retained may be stored in files that are designated as "WORMED" (also referred to as WORM files), and a system may provide protection mechanisms preventing changes to the WORM files and to at least some of their metadata. Generally, a system that implements a WORM data retention scheme may store non-WORM files as well as WORM files; therefore, it may be necessary for the system to determine which files should be designated as WORMED and when. Protections may only be provided for a file once the file is designated as a WORM file; therefore, a file may undergo many changes (e.g., writes) before being WORMED.

As described above, it may be necessary for a system to determine which files should be designated as WORMED and when. As explained in more detail below, such a system may be, for example, a storage computing device that provides access to files stored on a storage device. Various systems may allow an administrator to manually designate files in the system as WORMED. Manual WORM designation may require an administrator to explicitly issue commands to transition the state of a file from normal (e.g., non-WORMED) to WORMED. However, in some systems, the number of files that may need to be considered for retention may be very large. Additionally, in some scenarios, it may be desirable to implement a policy of WORMING only certain types of files (e.g., files of a particular user, or files created on a certain date). The sheer number of files on some systems and the complexities of manually segregating files to WORM or not WORM according to a policy may make manual WORM designation difficult to manage and non-scalable.

In some scenarios, it may be possible to automate some of the segregation and WORM designation tasks described above, for example, by using various commands, applications, scripts or the like. However, such applications, scripts and the like are not tightly integrated with the file system of the storage computing device. In other words, such applications/scripts, in order to determine whether a file should be WORMED (i.e., a file check), may access the storage device by issuing commands to the operating system of the storage computing device. The operating system may then reference the file system to access the files in the storage device. Such applications/scripts may communicate with the operating system to scan the storage device for files (perhaps a large number of files) that should be WORMED. Such scans are performed by issuing reads (perhaps a large number of reads) to the physical disk in the storage device. Further, such reads are performed for the purpose of determining files that may need to be WORMED, and not for a "natural" purpose, such as reading the contents of a file to present the contents to a user who is using the file. Issuing mass reads (e.g., if the file set is huge) to a physical disk may reduce the performance of the storage computing device, which may result in reduced performance of "natural" file operations.

For the purposes of this disclosure, the word "natural," as it may pertain to natural file operations, natural access of files or the like may refer to operations that are performed on files or metadata in the natural operation of a computing device and file system. For example, users or applications may access (e.g., via a file system) files and/or metadata to carry out the purpose of the user or the application. Examples of natural operations include a file read, a file write, a command to read the metadata of a file (e.g., getattr( )), a command to write the metadata of a file (e.g., setattr( )) or the like. Natural operations may be contrasted to operations that are performed only for WORM or retention purposes. In other words, various applications and scripts for automating WORM tasks may initiate additional or separate file operations beyond natural file operations that the file system was already performing. For example, a script may perform an additional or separate read of a file (e.g., as part of a drive-wide scan) only for the purpose of determining whether the file should be WORMED.

The present disclosure describes automatic WORM-retention state transitions, where WORM file checks are performed when files are naturally accessed. The present disclosure describes a WORM-retention solution that is tightly integrated with the file system of a storage computing device. In addition to the WORM file checks being performed when the file system is naturally accessing files, a file retention policy may be maintained in or close to the file system. In this respect, a solution may be implemented internal to or tightly with the file system, and when file accesses naturally occur, the retention policy may be quickly referenced to determine if a file should be WORMED, or whether other state transitions should occur. Once the retention policy is configured, an administrator may not be required to issue additional or separate commands (e.g., via a script) to determine which files should be WORMED. In this respect, the present disclosure may offer "on demand" file checks, which means that files are not unnecessarily checked and which means files are checked when they need to be (e.g., when they are being accessed). This may offer benefits over various other WORM solutions that perform "forceful" file checks, e.g., a script reading a file to determine whether the file should be WORMED, even if the file has not been accessed for 20 years. In present disclosure, because files are checked when they are naturally accessed and because unnecessary file checks are avoided, the present solution may cause little impact to the performance of the system.

For the purposes of this disclosure, the terms "WORM" and "WORMED" may be are used to generally refer to a file that is protected against change and which may also be protected against deletion. However, the terms WORM and WORMED are also used herein refer to a particular designation for a file (e.g., in WORM lifecycle 100) where the file is not permitted to be changed, but may be deleted, e.g., in contrast to the designation of WORM-RETAINED, where the file is not permitted to be changed or deleted. Therefore, it should be understood that the general terms WORM and WORMED are used to refer to both WORM designated files and WORM-RETAINED designated files.

FIG. 1 is a flowchart of an example WORM lifecycle 100 for a file, where, according to solutions of the present disclosure, automatic WORM-retention state transitions may be applicable in such a lifecycle. Lifecycle 100 depicts various file designations for a file: NORMAL, DELETED, WORMED, WORM-RETAINED, HELD WORMED and HELD WORM-RETAINED. A file may have one of these file designation at any one time, and the file's designation may be stored in the metadata of the file, as described below. It should be understood that HELD WORMED and HELD WORM-RETAINED files may actually each include two file designations—HELD and the WORM designation. However, a file may only have one of the file designation-combinations specified above at one time. The term "retention state" may be closely related to the file designations indicated above and explained in more detail below. The term retention state may refer to the file designation-combination associated with the file, where the retention state may effect whether and what kind of WORM-retention protection a file may receive.

A NORMAL file designation may indicate that the file is mutable, meaning that file contents/data and metadata can be changed (e.g., written to). A NORMAL file may also be deleted. A DELETED file designation indicates that the file has been deleted from the system (or at least moved to a trash bin of sorts for future deletion). A WORMED file designation indicates that the file is immutable, meaning that file contents/data and metadata cannot be changed (e.g., written to). A WORMED file may be deleted. A WORM-RETAINED file designation indicates that the file is immutable, meaning that file contents/data and metadata cannot be changed (e.g., written to). Preventing metadata from being changed may also prevent the location (e.g., in which directory) of the file from being changed. A WORM-RETAINED file may not be deleted. A WORM-RETAINED file may keep this file designation for a defined period of time (e.g., a retention period).

A HELD file designation (e.g., applicable to HELD WORMED and HELD WORM-RETAINED) may indicated that the file is subject to a legal hold. A file may be subject to a legal hold if, for example, an entity (e.g., a government agency) specifically requests the file to be held. A HELD file may keep this file designation for an indefinite period of time, for example, until the system administrator removes the HELD designation from the file (e.g., in response to the entity indicating to the system administrator that the legal hold has been removed). A HELD file designation indicates that the file may not be deleted. A file may be designated with both a HELD designation and a WORMED or WORM-RETAINED designation. A HELD file may change WORM designations, for example, from WORMED-RETAINED to WORMED and vice versa. If the HELD designation is removed from a HELD WORM-RETAINED file, the file will remain a WORM-RETAINED file. If the HELD designation is removed from a HELD WORMED file, the file will remain a WORMED file.

As can be seen in FIG. 1, a file may start out with a NORMAL file designation 102, for example, when the file is created. While a file has a NORMAL file designation, the file may be modified (e.g., via operation 156) or read or deleted (e.g., via operation 152, resulting in the file being DELETED 104). A NORMAL file may be transitioned (e.g., via operation 154) to a WORM-RETAINED file (e.g., designation 106). At this point, the file is subject to WORM-retention protection (generally indicated by reference number 101) until the file is deleted (e.g., via operation 172). While the file has a WORM-RETAINED file designation, the file is immutable and undeletable. When a file is designated as a WORM-RETAINED file, a retention period may be specified for the file. At the end of the retention period, the file may transition (e.g., via operation 156) to a WORMED file (e.g., designation 108). While the file has a WORMED file designation, the file is immutable, but can be deleted (e.g., via operation 172, resulting in the file being DELETED 104). A WORMED file may be transitioned (e.g., via operation 158) to a WORM-RETAINED file (e.g., designation 106), and again, a retention period may be specified for the file.

Each of a WORM-RETAINED file (e.g., designation 106) and a WORMED file (e.g., designation 108) may be transitioned to include a HELD designation. A file with a HELD designation may not be deleted. A WORM-RETAINED file may transition (e.g., via operation 160) to a HELD WORM-RETAINED file (e.g., designation 110). A HELD WORM-RETAINED file may lose (e.g., via operation 162) it's HELD designation as well. A WORMED file may transition (e.g., via operation 164) to a HELD WORMED file (e.g., designation 112). A HELD WORMED file may lose (e.g., via operation 166) it's HELD designation as well. A HELD WORM-RETAINED file (e.g., designation 110) is still a WORM-RETAINED file, so it has a retention period. At the end of the retention period, assuming the file still has a HELD designation, the file will transition (e.g., via operation 168) to a HELD WORMED file (e.g., designation 112). A HELD WORMED file may be transitioned (e.g., via operation 170) to a HELD WORM-RETAINED file (e.g., designation 110), and again, a retention period may be specified for the file.

As can be seen in key 103 of FIG. 1, various operations of WORM lifecycle 100 may potentially occur manually and various operations may potentially occur automatically. Dotted lines depict operations that may potentially occur manually, and solid lines depict operations that may potentially occur automatically. A manual operation may occur, for example, as a result of a command that is explicitly issued by an administrator (e.g., via a user interface, application, script or the like). An automatic operation may occur, for example, by at least one of the modules described herein that are tightly integrated (explained more below) with the file system of a storage computing device.

FIG. 1 depicts one example embodiment, where operations 154, 156 and 168 may potentially occur automatically. It should be understood that in various other embodiments, variations may exist in which operations occur manually and which occur automatically. As one example, operation 154 may be performed automatically. This automatic transition from a NORMAL file to a WORM-RETAINED file may be based on a cool-off period or cool-off time, as described in more detail below. As another example, operation 156 may be performed automatically. This automatic transition from a WORM-RETAINED file to a WORMED file may be based on a retention period or retention-expiry time, as described in more detail herein. As another example, operation 168 may be performed automatically. This automatic transition from a HELD WORM-RETAINED file to a HELD WORMED file may be similar to automatic transition 156 (except the file is subject to a legal hold). Thus, transition 168 may be based on the same retention period or retention-expiry time, as described in more detail herein. In some situations, even if a system is configured to perform an automatic state transition, a manual transition may still be performed. For example, an administrator may manually transition (e.g., via operation 154) a NORMAL file to a WORM-RETAINED file, for example, before a cool-off period has expired.

FIG. 2 is a block diagram of an example storage system 200 for automatic WORM-retention state transitions. Storage system 200 may include a storage computing device 202 and at least one storage device (e.g., storage device 250). Storage computing device 202 may be any computing device capable of accessing at least one storage device (e.g., 250). Storage device 250 may be any repository or data store that is capable of storing digital information (e.g., digital data and/or files). Storage device 250 may include or be in communication with at least one physical storage mechanism, e.g., hard drive, solid state drive, tap drive or the like. Storage computing device 202 may communicate with storage device 250 to access files (e.g., file 252) stored on storage device 250, for example, to provide access to such files to applications (e.g., 210). Storage computing device 202 may communicate (e.g., via a network) with at least one client computing device (not shown), for example, to provide access to files to users of the computing device(s).

Storage device 250 may store at least one file, for example, file 252. Each file may include file contents/data (e.g., file contents 254) and file metadata (e.g., metadata 256). File contents 254 may include, for example, data that a user sees when they open the file. File contents 254 may also include formatting information (e.g., XML or some other markup language) that may be used to format how the data appears when displayed to a user. Metadata 256 may be data that provides information about the file, for example, when the file was created, the user that owns the file and the like. Metadata 256 may also include access permissions for the file, for example, whether the file may be read, written to, deleted, etc. In some embodiments of the present disclosure, metadata 256 may include at least one of the following: a cool-off date, a retention-expiry date, a WORMED indicator, a WORM-RETAINED indicator, a legal hold (HELD) indicator and a NOT-WORMABLE indicator. The purpose of these pieces of metadata may be described elsewhere in this disclosure.

Storage computing device 202 may include an operating system 204. Operating system 204 may include a series of instructions encoded on a machine-readable storage medium and executable by a processor of the storage computing device 202. Operating system 204 may manage the resources (e.g., hardware, memory and storage resources) of storage computing device 202. Operating system 204 may provide a common interface to resources for applications that run on the computing device. For example, application 210 may communicate with the operating system 204 to access storage device 250, e.g., in an attempt to access a WORM protected file on storage device 250. Operating system 204 may communicate with an interface for an administrator (e.g., admin interface 212) that allows a system administrator to access storage device 250, e.g., to manually designate a file as WORM-RETAINED. An administrator may also be able to access (e.g., via an admin interface) retention policy 220, for example, to set the details of the retention policy.

In alternate configurations, application(s) 210 and/or admin interface 212 may be located in a separate computing device that is in communication (e.g., via a network) with computing device 202. In these configurations, users or administrators may interact with the separate computing device and storage computing device 202 may include an interface (e.g., a web server) to allow the separate computing device to access the operating system 204 and, in turn, storage device 250.

Operating system 204 may include a file system 206. File system 206 may include information and/or a series of instructions stored and/or encoded on a machine-readable storage medium. File system 206 may include information that allows applications to access a storage device connected to (or included in) the storage computing device 202. File system 206 may include information about the organization of data on storage device 250. In some situations, the file system of a computing device may be tightly integrated with the operating system, perhaps to the point where it may be hard to distinguish the file system from the operating system. In some situations, the file system may be separate from or external to the operating system and yet may still be tightly integrated with the operating system. Operating system 204 may include at least one device driver (e.g., 208) to facilitate communication with at least one hardware resource (e.g., storage device 250).

For the purposes of this disclosure, the term "tightly integrated," for example, as used to describe the file system in relation to the operating system, or the automatic WORM-retention state transition module in relation to the file system, or the retention policy in relation to the file system, may mean that the first item is either contained within the second item, or it may mean that the first item is located close to (e.g., the same block of machine-readable instructions and/or information, on the same storage device) the second item, thereby allowing for quick communication between the first item and the second item. For example, the WORM-retention state transition module (first item) may be tightly integrated with the file system (second item), which may mean that the instructions related to the WORM-retention state module are close to the instructions and/or information for the file system, such that the WORM-retention state module may quickly communicate with the file system, for example, when the file system is performing an operation (e.g., a file write).

File system 206 may include a number of modules 214, 216, 218. Each of these modules may include a series of instructions encoded on a machine-readable storage medium and executable by a processor of the storage computing device 202. With respect to the modules described and shown herein, it should be understood that part or all of the executable instructions included within one module may, in alternate embodiments, be included in a different module shown in the figures or in a different module not shown. In yet other embodiments, these modules may be located separate from or external to the file system and yet may still be tightly integrated with the file system (e.g., still included in the operating system 204). More details regarding an example machine readable storage medium of an example storage computing device, and example instructions encoded thereon may be described below, for example, with regard to FIG. 5.

File system 206 may include at least one retention policy (e.g., 220), sometimes also referred to as a "profile." In some embodiments, file system 206 may include more than one retention policy, where each retention policy is similar to retention policy 220 described below. One of multiple retention polices may be selected based on various factors. Retention policy 220 may include information that indicates various rules and the like that define the WORM-retention behavior of the storage computing device 202. Retention policy 220 may include information that indicates various settings and/or values that may be used by the automatic WORM-retention state transition module 214 and perhaps other modules such as the WORM-Retention module 216.

Retention policy 220 may be tightly integrated with file system 206 (e.g., retention policy 220 may be maintained within or close to file system 206). In this respect, when a file is naturally accesses via file system 206, retention policy 220 is quickly accessible to the file system. Because file system 206 is already handling a request for this file (e.g., a "natural" operation), file system 206 may quickly reference the retention policy and determine (e.g., via module 214) if a file should be WORMED, or whether other state transitions should occur.

Retention policy 220 may provide rules that may define different retention behaviors settings based on various factors (e.g., file-related factors). Example factors, without limitation, include the type of file, the size of the file (e.g., files within a certain size range), ownership of the file (e.g., files belonging to a common user), user groups, authentication domains, the location of the file/the file system path (e.g., files having a common file system path), the physical location of the file (e.g., files stored in a common storage device), custom file system shares (e.g., files belonging to a common file system share). Example retention behavior settings, without limitation, include whether the file is WORMABLE (explained more below), the retention type (e.g., Enterprise/Relaxed/Compliant), commonality filter, minimum retention period, maximum retention period, retention period, cool-off period. As one example implementation of these factors and rules, different cool-off periods and retention periods may be used for different users. Retention policy 220 may provide sub rules that may be used to further tailor retention behavior to certain situations. For example, certain retention options may be used for users from a particular state, and then particular users within the state.

A cool-off period is one example retention behavior setting, for example, that may be set and stored in retention policy 220. As described above, multiple cool-off periods may be defined, for example, related to different rules and factors. A cool-off period may indicate a period of time, during which, if no changes are made to a NORMAL file (data or metadata), the file may be transitioned (e.g., via operation 154 of FIG. 1) to a WORM-RETAINED file or a WORMED file. A retention period is another example retention behavior setting, for example, that may be stored in retention policy 220. As described above, multiple retention periods may be defined, for example, related to different rules and factors. A retention period may indicate a period of time that extends beyond the cool-off period, at the expiry of which, a file (e.g., a WORM-RETAINED file) may be transitioned (e.g., via operation 156 of FIG. 1) to a retention state with reduced WORM-retention protections (e.g., to a WORMED file). In some situations, at the time a file is naturally accessed, the cool-off period and the retention period may have expired, in which case, a NORMAL file may transition directly to a WORMED file (even though such an operation may not be shown in lifecycle 100).

Automatic WORM-retention state transition module 214 may facilitate automatic WORM-retention state transitions using various rules and behavior settings (e.g., cool-off period and retention period) stored in retention policy 220, and various pieces of information from metadata of files (e.g., cool-off times and retention-expiry times). As can be seen in FIG. 2, automatic WORM-retention state transition module 214 may serve as the first line of access when an application (e.g., 210) attempts to access (e.g., via file system 206) a file (e.g., 252) in storage device 250. Therefore, it can be said that the automatic WORM-retention state transition module 214 operates in the file system access path. When an application attempts a file access, automatic WORM-retention state transition module 214 may access retention policy 220 and the metadata of the target file. Automatic WORM-retention state transition module 214 may then perform checks, calculations and/or other routines to automatically determine whether any WORM-retention state transitions should occur. Then, automatic WORM-retention state transition module 214 may communicate with WORM-retention module 216 (and in turn, storage device interface module 218 and device drivers 208) to change the metadata of the file (to effect the state transition).

WORM-retention module 216, storage device interface module 218 and device driver(s) 208 may each provide functionality that allows communication with storage device 250, and files therein. WORM-retention module 216 may provide WORM-retention protection for WORMED files. For example, module 216 may allow reads to WORMED files, but may return an error if an application attempts to modify a WORMED file. Storage device interface module 218 and device driver(s) 208 may provide lower level functionality, for example, that allows access to the structural components of the storage device and the digital files stored therein.

FIG. 3 is a block diagram of an example automatic WORM-retention state transition module 300. Module 300 may be similar to module 214 of FIG. 2, for example. Automatic WORM-retention state transition module 300 may include a number of modules (e.g., modules 302, 304, 306, 308, 310, 312). Each of these modules may include a series of instructions encoded on a machine-readable storage medium and executable by a processor of the storage computing device. With respect to the modules described and shown herein, it should be understood that part or all of the executable instructions included within one module may, in alternate embodiments, be included in a different module shown in the figures or in a different module not shown.

Access detector module 302 may detect accesses that are coming into the file system (e.g., file system 206). Accesses may be attempts by a user, for example, to access files (i.e., "target files") in a storage device (e.g., 250). Access detector module 302 may determine whether an access is the type of access that may require WORM attention. For example, reads may be allowed to pass through because WORM files may be read. However, accesses such as file creations, file modifications and file deletions may require WORM attention. Access detector module 302 may detect "natural" accesses to the file system as described above. Access detector module 302 may initiate various other modules to perform automatic WORM-retention state transitions based on the detection of a natural access. In this respect, no additional or separate file accesses may need to be issued to determine whether files may need to be WORMED.

Current access time module 304 may detect the current time when an access (e.g., at module 302) occurs. Current access time module 304 may receive the current time from a system time or system clock. Current access time module 304 may store the current time or system time, for example, in a variable called "current file access time". This current file access time may be used later by other modules (e.g., module 312).

WORMABLE file checker module 306 may determine whether the target file being accessed is "WORMABLE." If a file is WORMABLE, it may be protected by various WORM-retention protections described herein. If a file is not WORMABLE, the file may not be designated as WORMED or WORM-RETAINED, and will not be made immutable. A file may not be WORMABLE if it has been designated as NOT-WORMABLE. Individual files may be marked as NOT-WORMABLE in the metadata of the file. Therefore, WORMABLE file checker module 306 may access the file metadata 322 (e.g., similar to 256). A retention policy may designate certain types of files as being NOT-WORMABLE. For example, files owned by certain users may never be WORMABLE. Therefore, WORMABLE file checker module 306 may access retention policy 320 (e.g., similar to retention policy 220).

Cool-off time module 308 may determine a cool-off time for the file being accessed. The cool-off time is related to the cool-off period (stored in the retention policy). The cool-off time is the time (e.g., system time) when the cool-off period expires for a particular file. A cool-off time is designated for each file (stored in the file metadata). If a particular file, upon access, does not have a cool-off time specified or if the cool-off time for that file has not passed yet upon modification of the file, cool-off time module 308 may calculate a new cool-off time for the file. The cool-off time for a file may be calculated as follows: cool-off time=[last modification time of file, including creation time]+[cool-off period, from the retention policy]. If a cool-off time has been designated for the file, cool-off time module 308 may read the cool-off time from the metadata of the file. As described, cool-off time module 308 may access the retention policy 320 and the file metadata 322. Cool-off time module 308 may also write to the metadata of the file, for example to store a new cool-off time. It should be understood that the term "time" as it is used with regard to cool-off time, retention-expiry time, last modification time and the like should be interpreted to include a date and time.

Retention-expiry time module 310 may determine a retention-expiry time for the file being accessed. The retention-expiry time is related to the retention period (stored in the retention policy). The retention-expiry time is the time (e.g., system time) when a time period defined by [cool-off period+retention period] expires. A retention-expiry time is designated for each file (stored in the file metadata). If a particular file, upon access, does not have a cool-off time and retention-expiry time specified or if the cool-off time for that file has not passed yet upon modification of the file, retention-expiry time module 310 may calculate a new retention-expiry time for the file. The retention-expiry time for a file may be calculated as follows: retention-expiry time=[cool-off date]+[retention period, from the retention policy]. If a retention-expiry time has been designated for the file, retention-expiry time module 310 may read the retention-expiry time from the metadata of the file. As described, retention-expiry time module 310 may access the retention policy 320 and the file metadata 322. Retention-expiry time module 310 may also write to the metadata of the file, for example to store a new retention-expiry time.

File state transition module 312 may, upon access to a target file, initiate a WORM-retention state transition based on various factors such as the cool-off time and retention-expiry time of a file. File state transition module 312 may access the metadata of the target file, for example, to write the new state designation to the metadata of the file. In order to determine whether a targeted file should be state-transitioned, file state transition module 312 may receive the current file access time (e.g., from module 304), the cool-off time for the file (e.g., from module 308) and the retention-expiry time for the file (e.g., from module 310). If the current file access time is greater than the cool-off time, and less than (e.g., or equal to) the retention-expiry time, then the file may be transitioned to a WORM-RETAINED file. If the current file access time is greater than the cool-off time, and greater than the retention-expiry time, then the file may be transitioned to a WORMED file.

Figure 4:
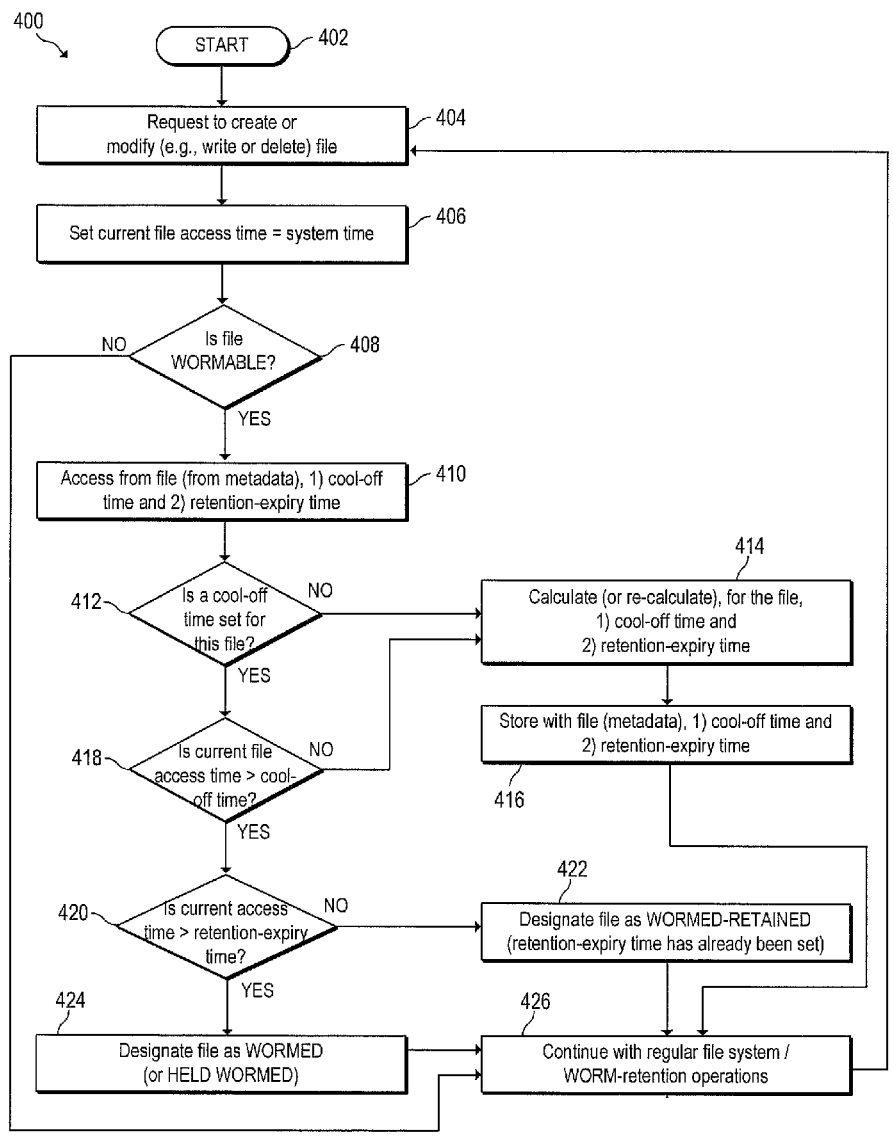
FIG. 4 is a flowchart of an example method for automatic WORM-retention state transitions.

FIG. 4 is a flowchart of an example method 400 for automatic WORM-retention state transitions. Although execution of method 400 is described below with reference to automatic WORM-retention state transition module 300 of FIG. 3, part or all of method 400 may be executed in at least one other suitable module of a storage computing device, for example, module 214 and/or module 216 of FIG. 2. Method 400 may be implemented in the form of executable instructions stored on a machine-readable storage medium, such as storage medium 520. In alternate embodiments of the present disclosure, one or more blocks of method 400 may be executed substantially concurrently or in a different order than shown in FIG. 4. In alternate embodiments of the present disclosure, method 400 may include more or less blocks than are shown in FIG. 4. In some embodiments, one or more of the blocks of method 400 may, at certain times, be ongoing and/or may repeat.

Method 400 may start at block 402 and continue to block 404, where a request to create or modify (e.g., write or delete) a target file may be received by the file system (e.g., 206), for example, a request by an application (e.g., 210). Also at block 404, automatic WORM-retention state transition module 300 may detect (e.g., via module 302) the access. At block 406, automatic WORM-retention state transition module 300 may set (e.g., via module 304) the "current file access time" (e.g., a variable) equal to the current system time. At block 408, automatic WORM-retention state transition module 300 may determine (e.g., via module 306) whether the target file is WORMABLE, for example, by accessing a retention policy (e.g., 220) and/or the target file's metadata (e.g., 256). If the file is not WORMABLE, method 400 may proceed to block 426, where the file system may continue to operate as normal (e.g., without performing any state transitions on the file). If the file is WORMABLE, method 400 may proceed to block 410.

At block 410, the automatic WORM-retention state transition module 300 may access (e.g., via modules 308 and 310) the metadata of the target file to read the cool-off time and the retention-expiry time of the file. At block 412, automatic WORM-retention state transition module 300 may determine (e.g., via module 308) whether a cool-off time has been set for the target file. If a cool-off time has not been set, method 400 may proceed to block 414, which is described below. If a cool-off time has been set, method 400 may proceed to block 418. At block 418, automatic WORM-retention state transition module 300 may determine (e.g., via module 312) whether the current file access time (e.g., from module 304) is greater than the cool-off time of the target file. If so, method 400 may proceed to block 414.

At block 414, automatic WORM-retention state transition module 300 may calculate or re-calculate (e.g., via modules 308 and 310), for the target file, a cool-off time and a retention-expiry time. At block 416, automatic WORM-retention state transition module 300 may initiate storage (e.g., via modules 308 and 310), in the metadata of the target file, the cool-off time and the retention-expiry time. Method 400 may then proceed to block 426, where the file system may continue to operate as normal (e.g., performing file checks on the file when the file is accessed again in the future).

At block 418, if the current file access time (e.g., from module 304) is not greater than the cool-off time of the target file, method 400 may proceed to block 420. At block 420, automatic WORM-retention state transition module 300 may determine (e.g., via module 312) whether the current file access time (e.g., from module 304) is greater than the retention-expiry time of the target file. If so, method 400 may proceed to block 422, where automatic WORM-retention state transition module 300 may designate (e.g., via module 312) the file as WORM-RETAINED. The retention-expiry time of the file has already been calculated at this point. Method 400 may then proceed to block 426, where the file system may continue to operate as normal (e.g., performing file checks on the file when the file is accessed again in the future).

At block 420, if the current file access time (e.g., from module 304) is not greater than the retention-expiry time of the target file, method 400 may proceed to block 424. At block 424, automatic WORM-retention state transition module 300 may designate (e.g., via module 312) the file as WORMED. Method 400 may then proceed to block 426, where the file system may continue to operate as normal (e.g., performing file checks on the file when the file is accessed again in the future). In general, with regards to block 426, "normal operation" may refer to the way that the file system handles requests to access files (either WORMED or not). For example, the file system may allow modification of non-WORMED files, and may return an error if a modification access is attempted to a WORMED file. Normal operation may also be indicated in method 400 by the progression from block 426 back to block 404. In this respect, if a state transition, setting or other data was changed when a file was accessed, the file may be modified and then the method 400 may execute again when the file is next accessed. Method 400 may continue throughout the existence of the file system.

Figure 5:
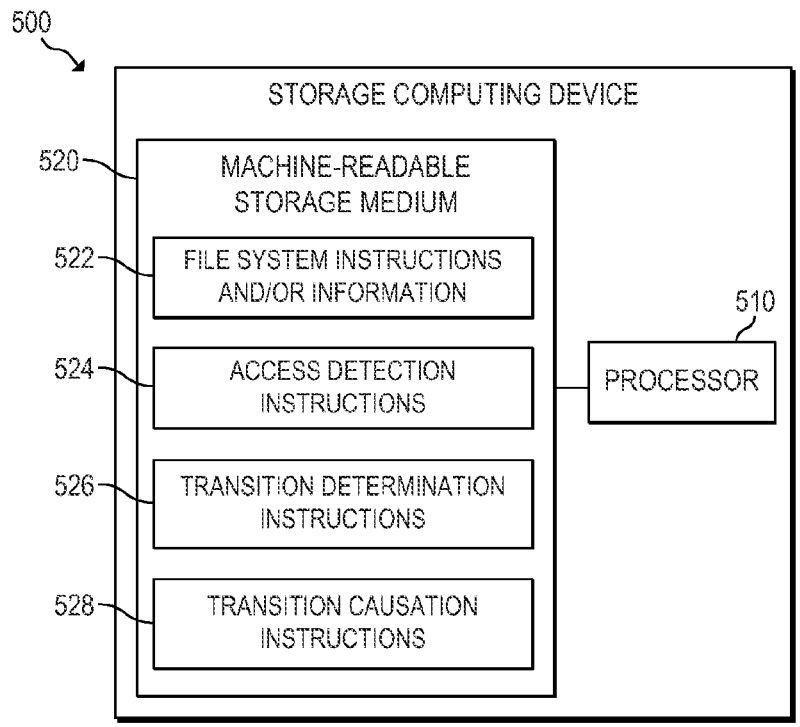
FIG. 5 is a block diagram of an example storage computing device for automatic WORM-retention state transitions.

FIG. 5 is a block diagram of an example storage computing device 500 for automatic WORM-retention state transitions. Storage computing device 500 may be any computing device capable of communicating with a storage device (e.g., 250) to access files (e.g., file 252) stored on the storage device. More details regarding an example storage computing device may be described herein, for example, with respect to storage computing device 202 of FIG. 2 and automatic WORM-retention state transition module 300 of FIG. 3. In the embodiment of FIG. 5, storage computing device 500 includes a processor 510 and a machine-readable storage medium 520.

Processor 510 may be one or more central processing units (CPUs), microprocessors, and/or other hardware devices suitable for retrieval and execution of instructions stored in machine-readable storage medium 520. Processor 510 may fetch, decode, and execute instructions 522, 524, 526, 528 to, among other things, perform automatic WORM-retention state transitions. With respect to the executable instruction representations (e.g., boxes) shown in FIG. 5, it should be understood that part or all of the executable instructions included within one box may, in alternate embodiments, be included in a different box shown in the figures or in a different box not shown.

Machine-readable storage medium 520 may be any electronic, magnetic, optical, or other physical storage device that stores executable instructions. Thus, machine-readable storage medium 520 may be, for example, Random Access Memory (RAM), an Electrically-Erasable Programmable Read-Only Memory (EEPROM), a storage drive, an optical disc, and the like. Machine-readable storage medium 520 may be disposed within storage computing device 500, as shown in FIG. 5. In this situation, the executable instructions may be "installed" on the device 500. Alternatively, machine-readable storage medium 520 may be a portable (e.g., external) storage medium, for example, that allows storage computing device 500 to remotely execute the instructions or download the instructions from the storage medium. In this situation, the executable instructions may be part of an installation package. As described in detail below, machine-readable storage medium 520 may be encoded with executable instructions for automatic WORM-retention state transitions.

File system instructions and/or information 522 may include information about the organization of data on a storage device, and may include information that allows applications to access the storage device. File system instructions and/or information 522 may be similar to file system 206 of FIG. 2, for example. Access detection instructions 524 may detect accesses that are coming into File system instructions and/or information 522 and may determine whether an access is the type of access that may require WORM attention. Access detection instructions 524 may be similar to access detector module 302 of FIG. 3, for example. Transition determination instructions 526 may determine, in response to a request to access a file, that the file should be designated with a different retention state. Transition causation instructions 528 may cause the file to be associated with the different retention, for example, by communicating with the file system. Transition determination instructions 526 and transition causation instructions 528 may include similar instructions to modules 308, 310 and 312 of FIG. 3, for example.

Figure 6:
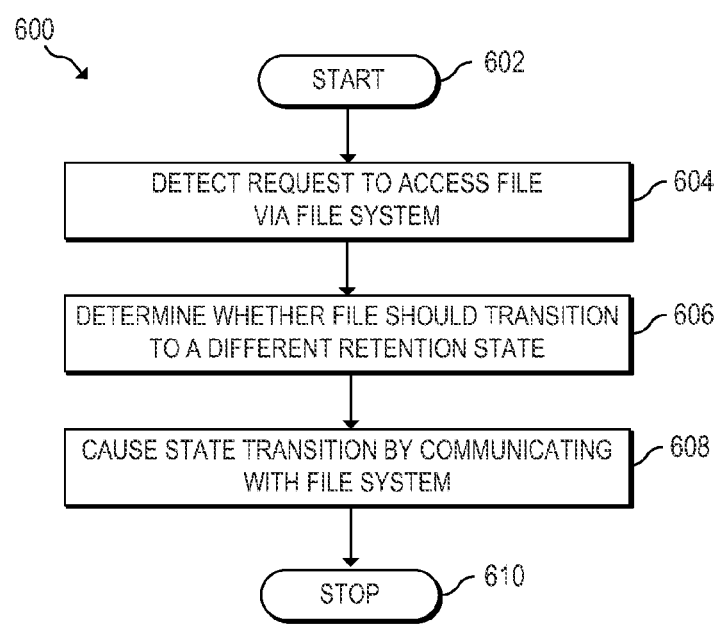
FIG. 6 is a flowchart of an example method for automatic WORM-retention state transitions.

FIG. 6 is a flowchart of an example method 600 for automatic WORM-retention state transitions. Method 600 may be executed by a storage computing device that may be similar to storage computing device 500 of FIG. 5. Other suitable computing devices may be used as well, for example, computing device 202 of FIG. 2. Method 600 may be implemented in the form of executable instructions stored on a machine-readable storage medium, such as storage medium 520. In alternate embodiments of the present disclosure, one or more blocks of method 600 may be executed substantially concurrently or in a different order than shown in FIG. 6. In alternate embodiments of the present disclosure, method 600 may include more or less blocks than are shown in FIG. 6. In some embodiments, one or more of the blocks of method 600 may, at certain times, be ongoing and/or may repeat.

Method 600 may start at block 602 and continue to block 604, where storage computing device 500 may detect a request (e.g., by a user, application or interface) to access a file, e.g., via file system instructions and/or information 522. At block 606, storage computing device 500 may determine whether the file should be transitioned to a different retention state. At block 608, storage computing device 500 may cause the file to transition to a different retention state, for example, by communicating with file system instructions and/or information 522. Method 600 may eventually continue to block 610, where method 600 may stop.

The invention claimed is:

1. A storage computing device for automatic write-once read-many retention state transitions, the storage computing device comprising:
   a processor to:
   run a file system that includes information regarding how to access a file, wherein the file is associated with a first retention state, wherein the first retention state indicates either a first type of a write-once read-many retention protection for the file or a no write-once read-many retention protection for the file;
   run a write-once read-many retention state transition module that is integrated with the file system;
   detect, via the write-once read-many retention state transition module, a request from a user, an application or an interface to access contents of the file via the file system;
   determine, via the write-once read-many retention state transition module, in response to the request, that the file is to be designated with a second retention state, wherein the second retention state indicates a second type of a write-once read-many retention protection for the file; and
   transition, via the write-once read-many retention state transition module, the file to be associated with the second retention state instead of the first retention state when it is determined, in response to the request, that the file is to be designated with the second retention state, wherein the write-once read-many retention state transition module causes the transition by communicating with the file system, wherein the transition is not dependent upon a fulfillment of the request to access the contents of the file.

2. The storage computing device of claim 1, wherein the determination that the file is to be designated with the second retention state is based on a retention policy file that is integrated with the file system.

3. The storage computing device of claim 2, wherein the determination that the file is to be designated with the second retention state is based on a cool-off period stored in the retention policy file, wherein the cool-off period indicates a period of time, during which, if no changes are made to the file, the file is to be designated with the second type of the write-once read-many retention protection.

4. The storage computing device of claim 3, wherein the determination that the file is to be designated with the second retention state is based on a cool-off time stored in metadata of the file, wherein the cool-off time is based on the cool-off period and a last modification time of the file.

5. The storage computing device of claim 2, wherein the determination that the file is to be designated with the second retention state is based on a retention period stored in the retention policy file, wherein the retention period indicates a period of time, after an expiry of which, the file is to be designated with a reduced write-once read-many retention protection.

6. The storage computing device of claim 5, wherein the determination that the file is to be designated with the second retention state is based on a retention-expiry time stored in metadata of the file, wherein the retention-expiry time is based on the retention period.

7. A method for execution by a storage computing device for automatic write-once read-many retention state transitions, the storage computing device having a file system running thereon, the file system having a retention policy stored therein, the method comprising:
   receiving, by the file system, a request to access contents of a file at a file access time, wherein the file is associated with a first retention state, wherein the first retention state indicates either a first type of a write-once read-many retention protection for the file or a no write-once read-many retention protection for the file;
   accessing, by the file system in response to receiving the request, metadata associated with the file to determine a cool-off time for the file, wherein the cool-off time is based on a configurable cool-off period stored in the retention policy, and wherein the cool-off time indicates an expiry of the cool-off period and that no changes were made to the file during the cool-off period;
   determining, by the file system in response to receiving the request, whether the file access time is greater than the cool-off time; and
   when the file access time is determined, in response to receiving the request, to be greater than the cool-off time, transitioning, by the file system, the file to be associated with a second retention state instead of the first retention state, wherein the second retention state indicates a second type of a write-once read-many retention protection for the file, wherein the transitioning is not dependent upon a fulfillment of the request to access the contents of the file.

8. The method of claim 7, wherein the first retention state indicates the no write-once read-many file retention protection for the file and the second retention state indicates write-once read-many retention protection that prevents the file from being modified or deleted.

9. The method of claim 7, further comprising:
   accessing, by the file system, metadata associated with the file to determine a retention-expiry time for the file, wherein the retention-expiry time is based on a configurable retention period stored in the retention policy, and wherein the retention-expiry time indicates an expiry of the retention period;
   determining, by the file system, whether the file access time is greater than the retention-expiry time; and
   transitioning, by the file system, the file to be associated with a third retention state, wherein the third retention state indicates a write-once read-many retention protection that prevents the file from being modified and allows the file to be deleted.

10. The method of claim 9, wherein the retention expiry time indicates an expiry of a time period that equals the cool-off period plus the retention period.

11. The method of claim 7, wherein the transitioning includes writing to the metadata associated with the file to indicate the second retention state.

12. A non-transitory machine-readable storage device encoded with instructions executable by a processor of a storage computing device for automatic write-once read-many retention state transitions, the instructions being integrated with a file system, the instructions comprising:
   instructions to detect a request to access, via the file system, contents of a file that is associated with a first retention state, wherein the first retention state indicates either a first type of a write-once read-many retention protection for the file or a no write-once read-many retention protection for the file;

instructions to determine, in response to the request, that the file should be designated with a second retention state, wherein the second retention state indicates a second type of a write-once read-many retention protection for the file, wherein the instructions to determine are based on a retention policy file that is integrated with the file system and metadata of the file; and instructions to transition the file to be associated with the second retention state instead of the first retention state when it is determined, in response to the request, that the file should be designated with the second retention state, wherein the transition instructions cause the transition by communicating with the file system, wherein the transition is not dependent upon a fulfillment of the request to access the contents of the file.

13. The non-transitory machine-readable storage device of claim 12, wherein the instructions to determine further include:

instructions to access the retention policy file that is integrated with the file system.

14. The non-transitory machine-readable storage device of claim 12, wherein the instructions to determine further include:

instructions to use a cool-off period that indicates a period of time, during which, if no changes are made to the file, the file will be designated with the second type of the write-once read-many retention protection.

15. The non-transitory machine-readable storage device of claim 12, wherein the instructions to determine further include:

instructions to use a retention period that indicates a period of time, after an expiry of which, the file will be designated with a reduced write-once read-many retention protection.

* * * * *